(12) United States Patent
Del Ben

(10) Patent No.: US 6,197,262 B1
(45) Date of Patent: Mar. 6, 2001

(54) DEVICE FOR THE DEPURATION AND SANITIZATION OF AIR

(76) Inventor: Sante Del Ben, Via San Quirino, 59 33170 Pordenone (IT)

(*) Notice: Subject to any disclaimer, the term of this patent is extended or adjusted under 35 U.S.C. 154(b) by 0 days.

(21) Appl. No.: 09/159,493

(22) Filed: Sep. 23, 1998

(30) Foreign Application Priority Data

Sep. 23, 1997 (IT) ............................... 97A000050

(51) Int. Cl.$^7$ ................................................ A62B 7/08
(52) U.S. Cl. .............................. 422/122; 239/45; 239/52; 422/124
(58) Field of Search .................... 422/4, 5, 122, 422/124; 239/45, 52

(56) References Cited

U.S. PATENT DOCUMENTS

| | | | |
|---|---|---|---|
| 3,282,776 | * | 11/1966 | Kitzke et al. |
| 3,353,337 | * | 11/1967 | Gale. |
| 4,229,408 | * | 10/1980 | Bennett et al. ........................ 422/5 |
| 4,734,109 | * | 3/1988 | Cox. |
| 4,999,302 | * | 3/1991 | Kahler et al. ................... 422/122 X |
| 5,292,479 | * | 3/1994 | Haraga et al. ................... 422/124 X |

* cited by examiner

Primary Examiner—Krisanne Thornton
(74) Attorney, Agent, or Firm—Wenderoth, Lind & Ponack, L.L.P.

(57) ABSTRACT

A device (1) for the depuration and sanitization of air comprising a tank (10) divided into at least two compartments (17–18) containing suitable liquids into which penetrate the lower parts of relative groups of perforated discs (21) arranged, suitably spaced one from the next, on a shaft (20), placed horizontally and set at its ends onto supports (131–141) obtained centrally on the transverse walls (13–14) which are at the extremities of the tank (10) and connected at one end to a geared electric motor (40).

The upper parts of the perforated discs (21) are housed in a semicylindrical casing (30) in which they are traversed by the air drawn in by means of a fan (7).

The liquids inserted into the compartments (17–18—etc.) of the tank (10) consist of a basic aqueous solution, with the addition of a surfactant and eventually antifoaming agents, to which can be added quaternary ammonium salts and/or organic salts whose adsorbing action allows also the sanitization of the treated air.

29 Claims, 1 Drawing Sheet

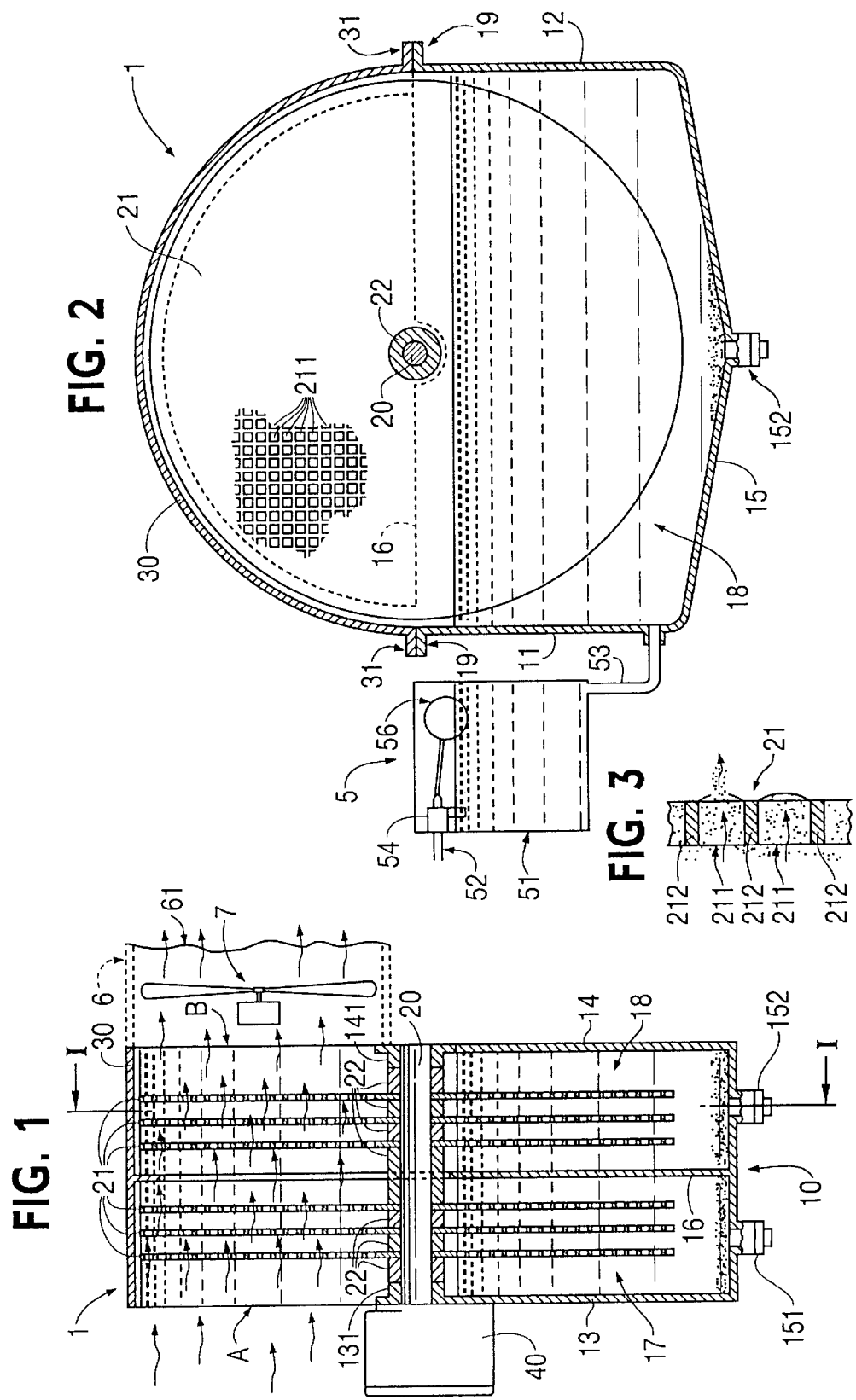

DEVICE FOR THE DEPURATION AND SANITIZATION OF AIR

DESCRIPTION

The present invention relates to a device that permits the treatment of air in a room in order to obtain its depuration as well as its sanitization.

Such a device is basically composed of a plurality of perforated discoid elements partially immersed in a suitable liquid and when made to rotate, after immersion, are traversed by the air to be treated and hence return to the liquid.

Similar devices are known, for example that described in the U.S. Pat. No. 3,353,337 (Gale) which however serves essentially for the removal of solid particles and vapours from gasses passing through it.

In such a device the gas to be treated is conveyed through perforations of a considerable size, made on rotating discs and arranged alternately with subsequent discs, and compelled, passing through the perforations of one disc, to impinge upon the solid part of the successive disc onto which dust deposits and this is then removed by scraping elements, accumulating at the bottom of the tank in which the discs are arranged and from which it is finally evacuated by means of a suitable extractor. The gas can then pass through successive groups of discs that are partially immersed in a liquid so that on their wet surfaces are deposited ulterior pollutants. An eventual further group of dry discs may follow serving to dry the previously treated gas. Such a device is considerably complex both structurally and functionally, its efficiency is considerably limited, it necessitates considerable dimensions with respect to the volume of gas that it can treat and lastly further treatment resulting in the sanitization of air is neither foreseen nor practicable. Other devices partially similar to the present invention are mentioned in the U.S. Pat. No. 3,350,887 (Bowman) and U.S. Pat. No. 1,535,335 (Koehler) which concern specific solutions for muffling and/or filtering elements of gas exhausts in endothermic engines and therefore have nothing to do with the aims and purposes of the device in object which, moreover, differs from these both structurally and functionally.

The only element partially similar contained in the present device, the above mentioned devices moreover in other devices, all with different aims and purposes such as those described in U.S. Pat. Nos. 3,733,062—2,703,228—1,584,635 and others, is the application of rotating discs which are perforated or variously conformed and which totally or partially in various ways come into contact with a liquid.

Having premised as much, the aims and purposes attainable with the device of this present invention can now be expounded.

It is well known that the air in diverse environments, for various reasons is often polluted by various substances which can be generated within the environments themselves or penetrate from the external atmosphere.

Particularly in closed environments such as dwellings or work premises, people suffer more or less considerably from the effects of inspiring contaminated air.

Often dust itself that normally exists in any environment can contain substances and/or particles such as pollen, dust mites etc. capable of provoking allergic reactions in many individuals.

In industrial premises, the development of various types of contamination can generate situations at times merely annoying such as obnoxious odours which in many cases can result to be also dangerous. Moreover, as is also well known, air normally contains, in addition to normal pollutants such as dust, vapours and gasses, bacteria and viruses which, especially in hospital environments, can be dangerous due to their capability of carrying and/or spreading diseases of a various nature.

The aim therefore of the present invention is not only to obtain the utmost depuration of the air in various environments but also to allow opportune treatment of said air thus obtaining special sanitization effects and this can be brought about with the device in object which, for better understanding its characteristics and advantages will be described hereinafter by way of example and implying no limitation, with the aid of the accompanying drawings, wherein:

FIG. 1 shows the device object of the invention disclosed in a longitudinal section FIG. 2 is a cross section through the line 1—1 of FIG. 1

FIG. 3 shows, with an enlarged detail of one of the elements arranged in the air treating device illustrated in the previous figures, how the depuration and/or sanitization of the air is obtained.

Identical parts are indicated by common references in the above mentioned drawings.

It can be noted that the device 1 which is the object of the present invention is basically made up of a tank 10 of a parallelepiped form defined along its perimeter by four vertical walls and precisely two longitudinal walls 11–12 parallel one to the other and connected at their extremities by two transverse walls 13–14 also parallel one to the other as well as orthogonal to the aforementioned, the resulting bottom being enclosed by a relative inclined wall 15 opportunely turned towards the exterior for reasons to be later expounded. A further internal transverse wall 16 divides the tank 10 thus forming two corresponding compartments 17–18.

A horizontally disposed shaft 20 is mounted on two supports 131 and 141 obtained at the centre of the upper edges of said transverse walls 13–14 and on this are mounted a plurality of perforated discs 21 opportunely axially spaced by means of suitable spacing sleeves and arranged so that some penetrate into compartment 17 and the others into compartment 18, said shaft 20 being furthermore connected at one end to a suitable geared electric motor 40 fit for setting it into rotation with the relative perforated discs 21 arranged on it.

On the upper part of the tank 10 is mounted a cover consisting essentially of an semicylindrical encasement 30 open at each end A and B which connects laterally with its longitudinal edges 31 to the corresponding superior longitudinal edges 19 of said longitudinal walls 11–12 onto which it is interfaced by way of suitable sealing elements which are conventional and not illustrated.

Said perforated discs 21 have an external diameter marginally less than the internal diameter of the semicylindrical encasement 30 and therefore relatively distanced from the internal surfaces of said longitudinal walls 11–12 and penetrate with their respective inferior parts into the corresponding compartments 17–18 of the tank 10 remaining however opportunely suitably distanced from the wall 15 which forms the respective bottoms so as to avoid during rotation the removal of substances which deposit progressively onto said bottom, as will be described in due course.

Moreover, it must be pointed out that such perforated discs 21 are of a reasonable thickness and the perforations 211 thereon are preferably of a square form with sides approximately equal to their thickness varying between mm.5 and mm.10 and which result outlined and separated one from the next by solid parts 212 of approximately mm.2 in thickness.

In each of the compartments 17–18 as can be seen in FIG. 2 the respective bottoms formed by the respective parts of the inclined wall 15, are supplied with respective suitable discharge couplings 151–152 normally closed by appropriate plugs able to permit when necessary (on removal of the respective plugs) the evacuation of the liquid which, during use as will be described, becomes progressively impregnated with polluting substances extracted from the air.

As can also be seen in FIG. 2, each of the said compartments 17 and 18 will be continuously replenished by means of suitable feeder devices 5 fit for maintaining constant the level of liquid in compartments 17 and 18, level which as can be seen clearly also in FIG. 1 is suitably below the perimeter of the upper edge of the tank 10. In the interests of clarity and simplicity of illustration in such drawing only one feeder device 5, relating to compartment 18, is indicated, obviously the same device will be provided for the other compartment 17.

The composition and conformation of such feeder devices 5 may be widely varied, thus, solely by way of example, the feeder device 5 illustrated in FIG. 2 is indicated by a thin line and comprises a tank 51 arranged on one side of the device 1 supplied with a feeding duct 52 on the upper part and an adduction duct 53 which leading from its bottom connects to a lower part of a respective compartment (17–18). The feeding duct 52 flowing into the tank 51 will be furnished with a suitable intercepting device 54 which, in the illustrated solution referred to, can be controlled by a suitable float, such intercepting device being able to fix and maintain in the relative tank 51 a constant level of the liquid flowing in from the feeding duct 52 and therefore clearly of the liquid in the relative compartment (17–18).

The feeding of the tank 51 of each feeding device 5 can be brought about directly from the main water supplying system or from a suitable auxiliary tank not illustrated. In the first case obviously the replenishment obtained will be of water only whilst in the second case it will be of various appropriate liquids or in particular, for reasons to be expounded in due course, of appropriate aqueous solutions.

Lastly, as can be clearly noticed in FIG. 1, at least one of the open ends A or B of the semicylindrical casing 30, open end B in the case illustrated, is appropriately connected to an air duct 6 (indicated generally by a dashed line) opening out at its free end 61, directly into the atmosphere and in which is arranged a suitable fan 7. The other open end A of said semicylindrical casing 30 also opens out into the atmosphere either directly as illustrated or by means of a relative duct not shown. The fan 7, in the case illustrated to which reference is made, functions so as to draw in, from the environment in which the device 1 is positioned, the air to be treated which penetrates through the open end A of the semicylindrical casing 30 flowing through the upper parts of the perforated discs 21 housed therein, undergoes the desired processes of depuration and sanitization as will be expounded in detail in due course, after which emerging from the end open B the treated air proceeds into the duct 6, containing the fan 7 returning finally to the same environment from which it was drawn.

The functioning of such described device nevertheless differs substantially from those known for the following reasons:

1) the perforated discs 21 are of a reasonable thickness (about mm.1)

2) the perforations made on such perforated discs 21 have a depth equal to or reasonably greater than the respective transverse dimension and the width of the solid parts 212 surrounding and connecting the same is preferably about mm. 2.

3) the distance between each single perforated disc 21 is equal to or greater than its thickness at most twice the latter 4) the liquid used basically even for the mere depuration is composed of an aqueous solution containing a suitable surfactant and an eventual suitable antifoaming substance 5) the rotational speed of the discs is very limited (about 2 r.p.m.)

6) the speed of the air passing through the device is limited, preferably below the maximum speed of about m/s1,7

The above mentioned specific values and dimensional ratios together with the functional parameters and the specific basic liquid used for treating the air enable to obtain not only an efficiency that even in the simple depuration of the air results remarkably superior to that obtainable with similar devices that permits notable advantageous reductions in the overall dimensions of the appliance and the device itself housed therein but also numerous ulterior applications for diverse particularly useful and in some cases exceptionally advantageous employment especially in the medical and therapeutical fields.

In the interests of clarity, the operation of the device for the mere depuration of the air essentially from microscopic particles and other likely substances is described.

In this first case the compartments 17 and 18 of the tank 10 are filled with a solution composed essentially of water to which has been added an adequate quantity of a suitable surfactant and if necessary an appropriate antifoaming agent.

The addition of a surfactant enables, as known, a complete wetting of all the parts of the perforated discs 21 which during operation, rotating, penetrate progressively and continuously into their respective baths that are present in the corresponding compartments 17 and 18 such that on emerging from these the surfaces of the perforated discs 21 which progressively position themselves in the internal chamber of the semicylindrical casing 30 remain wetted with a film of liquid which fills the perforations 211 moreover forming a film across each one.

The air undergoing treatment, the flow of which is produced by the fan 7 as already described, in the interest of clarity is indicated in FIG. 1 by a plurality of fine undulating arrows, entering into the aperture A of the semicylindrical casing 30 invests the first perforated disc 21 bathing its entire impinging surface formed by the outlines of the respective perforations 211, passes through the perforations 211 themselves bathing their lateral surfaces simultaneously pushing, as can be clearly seen in FIG. 3, the film, which forms as already said across each perforation, towards the opposite surface of the same perforated disc 21 where it forms as illustrated in the perforation 211 located in the lower part of said FIG. 3 a real bubble which on progressive expansion forms as illustrated in the perforation 211 located in the upper part of the same figure, explodes freeing so the passage of air that proceeding impinges against successive perforated discs 21 where it undergoes the same treatment.

Clearly, the particles of numerous types of polluting substances that are present in the air to be treated are subsequently incorporated in the liquid, in fact the stream of air which bathes the above mentioned wetted surface of the first perforated disc 21 yields to the liquid lining the same disc part of these polluting particles, the subsequent passage to the second disc 21 will cause further removal of polluting particles and so forth resulting finally, with a suitable number of perforated discs 21, in the virtually total depuration of the treated air.

The continuous rotation of the perforated discs 21 progressively transports the film of liquid that covers them and which as mentioned above has incorporated the polluting particles, into the respective baths afforded by compartments 17 and 18, where, in contact with the liquid therein, the polluting particles will be released and will progressively deposit on the respective bottoms. The perforated discs 21 will therefore be continuously washed and the respective upper parts protruding from the relative baths and housed within the semicylindrical casing 30 are able to accomplish the above described depuration.

Obviously, the amount of polluting substances collected by the perforated discs 21 will be greatest for the discs that first are exposed to the stream of air to be treated and will progressively diminish for subsequent discs. For this reason the tank 10 has been opportunely divided into two compartments 17 and 18 separated from each other in such a way that in the former (chamber 17) a more rapid amassment of sediment will take place than in the latter (chamber 18).

Consequently, in the second chamber 18 the liquid remains considerably less polluted than that in the preceding chamber 17 so that the washing procedure of the perforated discs 21 will maintain considerable efficiency during long periods of use. In any case, after opportune periods of use which for the aforementioned reasons will be briefer for chamber 17 and longer for chamber 18, it will be necessary to evacuate the sediment which accumulates in said compartments 17 and 18 by removing the plugs from the respective discharge couplings 151 and 152. It must be pointed out that it is not necessary, for proper operation of the device, to discharge all the liquid contained in the single compartments 17 and 18, but it is sufficient, above all if care is taken to arrest the rotation of the perforated discs 21 for an adequate period of time in order to allow a more or less complete precipitation of the sediment suspended in the liquid, just to discharge only part of the liquid and more precisely the more polluted part that deposits on the bottom.

It has been shown, from various tests that have been carried out, that the simple depuration of the air in the aforementioned fashion has permitted the removal, from the environment in which the device was located, of not only dust particles composed essentially of practically inert solid particles which normally do not create problems, but also microscopic particles such as pollen grains, dust mites, etc. which, as is common knowledge, induce allergic reactions in many people.

As much being established, the possibility of extending the range of utilisation of the device was hypothesised and after numerous attempts and experiments, it was shown that this is feasible with the result that the same device can be used not only for the exceptionally efficient depuration of air in an environment, but also for its proper sanitization which consents numerous applications both in specific industrial fields and in specific medical and therapeutical fields.

The problem was solved simply by adding to the aforementioned aqueous solution various suitable specific substances for different specific purposes.

For example, the simple addition to the aforementioned basic solution of small quantities of balsamic or emollient essences, even if only to the liquid contained in the second chamber 18, allows the emission into the air within the environment of a proper aerosol the remarkable efficacy of which has proven extremely useful to those persons suffering from asthma and other numerous respiratory diseases. Obviously in the same way, other fragrances for various uses and/or necessities can be diffused into the air.

It was therefore decided to further extend the performance of the device and after numerous attempts using a variety of substances, which ought to have permitted to reach the pre-established aims, finally extremely positive, not to say exceptional, results were obtained.

The substances used in practice are essentially quaternary ammonium salts, for example lauryidimethylammoniumchloride and/or organic salts such as ethylenediaminetetraacetic acid (E.D.T.A.), which as is well known, have remarkable advantageous sanitising effects.

Their presence in the bathing solution of the device causes a proper adsorption of innumerable substances such as micro-organisms in general including pathogenic microorganisms as well as gasses which can develop in various industrial processes such as, for example, those generated during the processing of photographic material or derived from the use of medical and/or surgical substances such as formaldehyde, glutaraldehyde Halothane and other products used in anaesthesia.

The adsorption of micro-organisms causes also their destruction so that the air issuing from the device will be not only depurated but also remarkably sterilised so that a room whose air is being treated by such a device, in a lapse of time which can be reasonably limited, can reach remarkable degrees of sterilisation.

From what has been stated, the particular functional characteristics, the remarkably numerous possibilities of application and use and the innumerable advantages obtainable in various fields, particularly in the medical and therapeutical field are evident.

It is clear that many variations may be applied to the device to which the present invention relates, particularly variations to the dimension, the shape and number of the compartments containing the treating liquid as well as the number of perforated discs arranged in each compartment, and other details, nevertheless without deviating from the ambit of what has been described and subsequently claimed with reference to the accompanying drawings, or from the bounds of protection of this patent.

What is claimed is:

1. A device for the depuration and sanitization of air, comprising:

a tank having a top, a bottom, two sides, a front and a back, wherein said two sides and said top are closed, said front and said back are closed from said bottom to a location intermediate said top and bottom, and said front and back are open from the location intermediate said top and bottom to said top, such that a combination of said bottom, said two sides, the closed front and the closed back define a chamber;

axially spaced discs rotatably supported within said tank, such that a first radial portion of each disc extends into said chamber and a second radial portion of each disc extends above said chamber; wherein each of said discs has a thickness of about 1 mm and includes generally square perforations extending therethrough, with a distance between adjacent perforations being about 2 mm.

2. The device according to claim 1, and further comprising at least one wall within said tank extending from said bottom to a position intermediate said top and bottom, wherein a combination of said bottom, said two sides, the closed front, the closed back and said at least one wall defines said chamber into at least two sub-chambers, with the first radial portion of each disc of a first plurality of said discs extending into one of said at least two sub-chambers, the second radial portion of each disc of said first plurality of said discs extending above said one sub-chamber, the first radial portion of each disc of a second plurality of said discs extending into another of said at least two sub-chambers, and the second radial portion of each disc of said second plurality of said discs extending above said other sub-chamber.

3. The device according to claim 2, and further comprising a treatment liquid contained in each of said at least two sub-chambers.

4. The device according to claim 2, and further comprising:
an outlet located in the bottom of each of said at least two sub-chambers; and
a feed device associated with each of said at least two sub-chambers to supply the treatment liquid to each of said at least two sub-chambers, respectively.

5. The device according to claim 1, wherein said discs are axially spaced from one another by a distance that is at least equal to the thickness of each of said discs.

6. The device according to claim 1, and further comprising:
a fan to draw air through said tank from the open front to the open back; and
a motor to rotate said discs.

7. The device according to claim 6, and further comprising a duct extending from the open back of said tank, wherein said fan is located within said duct.

8. The device according to claim 6, wherein said motor is an electric motor.

9. The device according to claim 1, wherein a combination of said top, said sides, and the open front and open back of said tank defines a passage having a semi-circular cross-section with a radius greater than the radius of said discs.

10. The device according to claim 1, wherein said tank includes a first segment having an upwardly facing flange and defining said bottom, a lower portion of each of said sides, the closed front and the closed back, and said tank also includes a second segment having a downwardly facing flange and defining said top, an upper portion of said sides, the open front and the open back, and wherein said downwardly facing flange is connected to said upwardly facing flange.

11. The device according to claim 1, wherein said discs are supported by a shaft, and said shaft is rotatably supported by the closed front and the closed back.

12. A device for the deputation and sanitization of air, comprising:
a tank having a top, a bottom, two sides, a front and a back, wherein said two sides and said top are closed, said front and said back are closed from said bottom to a location intermediate said top and bottom, and said front and back are open from the location intermediate said top and bottom to said top, such that a combination of said bottom, said two sides, the closed front and the closed back define a chamber;
axially spaced discs rotatably supported by a shaft within said tank, such that a first radial portion of each disc extends into said chamber and a second radial portion of each disc extends above said chamber; wherein each of said discs has a thickness of about 1 mm and includes generally square perforations extending therethrough, with a distance between adjacent perforations being about 2 mm, and wherein said discs are axially spaced from one another by a distance that is at least equal to the thickness of each of said discs;
at least one wall within said tank extending from said bottom to a position intermediate said top and bottom, wherein a combination of said bottom, said two sides, the closed front, the closed back and said at least one wall defines said chamber into at least two sub-chambers, with the first radial portion of each disc of a first plurality of said discs extending into one of said at least two sub-chambers, the second radial portion of each disc of said first plurality of said discs extending above said one sub-chamber, the first radial portion of each disc of a second plurality of said discs extending into another of said at least two sub-chambers, and the second radial portion of each disc of said second plurality of said discs extending above said other sub-chamber;
a fan to draw air through said tank from the open front to the open back;
a motor to rotate said shaft;
an outlet located in the bottom of each of said at least two sub-chambers; and
a feed device associated with each of said at least two sub-chambers to supply the treatment liquid to each of said at least two sub-chambers, respectively; and
a duct extending from the open back of said tank, wherein said fan is located within said duct.

13. The device according to claim 12, wherein said tank includes a first segment having an upwardly facing flange and defining said bottom, a lower portion of each of said sides, the closed front and the closed back, and said tank also includes a second segment having a downwardly facing flange and defining said top, an upper portion of said sides, the open front and the open back, wherein said downwardly facing flange is connected to said upwardly facing flange, and wherein a combination of said top, said sides, and the open front and open back of said tank defines a passage having a semi-circular cross-section with a radius greater than the radius of said discs.

14. The device according to claim 13, wherein said motor is an electric motor.

15. The device according to claim 14, and further comprising a treatment liquid contained in each of said at least two sub-chambers.

16. The device according to claim 15, wherein said treatment liquid includes an aqueous solution containing a surfactant.

17. The device according to claim 16, wherein said aqueous solution further contains an anti-foaming agent.

18. The device according to claim 17, wherein said aqueous solution further includes at least one of a fragrant substance, a balsamic substance and an emollient substance.

19. The device according to claim 18, wherein the same treatment liquid is contained within each of said at least two sub-chambers.

20. The device according to claim 18, wherein a different treatment liquid is contained within each of said at least two sub-chambers.

21. The device according to claim 17, wherein said aqueous solution further includes at least one of a quaternary ammonium salt and an organic salt.

22. The device according to claim 21, wherein said quaternary ammonium salt includes lauryldimethylbenzylammoniumchloride, and said organic salt includes ethylenediaminetetraacetic acid.

23. The device according to claim 15, wherein said aqueous solution further includes at least one of a fragrant substance, a balsamic substance and an emollient substance.

24. The device according to claim 23, wherein the same treatment liquid is contained within each of said at least two sub-chambers.

25. The device according to claim 24, wherein a different treatment liquid is contained within each of said at least two sub-chambers.

26. The device according to claim 15, wherein said aqueous solution further includes at least one of a quaternary ammonium salt and an organic salt.

27. The device according to claim 26, wherein said quaternary ammonium salt includes lauryldimethylbenzylammoniumchloride, and said organic salt includes ethylenediaminetetraacetic acid.

28. The device according to claim 27, wherein the same treatment liquid is contained within each of said at least two sub-chambers.

29. The device according to claim 27, wherein a different treatment liquid is contained within each of said at least two sub-chambers.

* * * * *